US011064556B2

(12) United States Patent
Bedekar

(10) Patent No.: US 11,064,556 B2
(45) Date of Patent: Jul. 13, 2021

(54) CONFIGURING RADIO RESOURCE CONTROL CONNECTIONS

(71) Applicant: Nokia Solutions and Networks Oy, Espoo (FI)

(72) Inventor: Anand Bedekar, Glenview, IL (US)

(73) Assignee: Nokia Solutions and Networks Oy, Espoo (FI)

(*) Notice: Subject to any disclaimer, the term of this patent is extended or adjusted under 35 U.S.C. 154(b) by 31 days.

(21) Appl. No.: 15/975,264

(22) Filed: May 9, 2018

(65) Prior Publication Data
US 2019/0350031 A1 Nov. 14, 2019

(51) Int. Cl.
*H04W 76/27* (2018.01)
*H04W 76/10* (2018.01)
*H04W 76/30* (2018.01)
*H04W 72/04* (2009.01)
*H04W 52/36* (2009.01)
*H04W 72/02* (2009.01)

(52) U.S. Cl.
CPC ....... *H04W 76/27* (2018.02); *H04W 72/0413* (2013.01); *H04W 76/10* (2018.02); *H04W 76/30* (2018.02); *H04W 52/365* (2013.01); *H04W 72/02* (2013.01)

(58) Field of Classification Search
CPC ..... H04W 76/00; H04W 76/10; H04W 76/45; H04L 29/06319; H04L 29/06326; H04L 29/08576; H04L 65/1069; H04L 67/141; H04L 49/253
See application file for complete search history.

(56) References Cited

U.S. PATENT DOCUMENTS

| | | | | |
|---|---|---|---|---|
| 2008/0039094 A1* | 2/2008 | Jeong | ...................... | H04W 76/10 455/436 |
| 2008/0305797 A1* | 12/2008 | Somasundaram | .... | H04W 24/10 455/436 |
| 2010/0291939 A1* | 11/2010 | Jen | ......................... | H04W 76/19 455/450 |
| 2011/0201343 A1* | 8/2011 | Pinheiro | ............... | H04W 64/00 455/450 |
| 2013/0039339 A1* | 2/2013 | Rayavarapu | .......... | H04W 76/19 370/331 |
| 2013/0195015 A1* | 8/2013 | Takahashi | ............. | H04W 76/10 370/328 |
| 2013/0237267 A1* | 9/2013 | Lee | ........................ | H04W 76/10 455/509 |
| 2013/0260811 A1* | 10/2013 | Rayavarapu | .......... | H04W 76/19 455/509 |
| 2013/0288693 A1* | 10/2013 | Dai | ........................ | H04W 72/04 455/450 |
| 2015/0141030 A1* | 5/2015 | Basu-Mallick | ....... | H04W 76/36 455/452.1 |

(Continued)

*Primary Examiner* — Warner Wong
(74) *Attorney, Agent, or Firm* — Brake Hughes Bellermann LLP

(57) ABSTRACT

Systems, apparatuses, and methods are described for configuring radio resource control (RRC) connections. A lightweight RRC component in a distributed unit may be configured to process RRC connection requests on behalf of an RRC component in a central unit. The central unit may send lightweight RRC configuration messages indicating information that may be used by the lightweight RRC component to generate RRC connection setup messages.

18 Claims, 6 Drawing Sheets

(56) References Cited

U.S. PATENT DOCUMENTS

| | | | |
|---|---|---|---|
| 2016/0044713 A1* | 2/2016 | Du | H04W 74/002 |
| | | | 370/329 |
| 2016/0105917 A1* | 4/2016 | Miao | H04W 76/10 |
| | | | 370/329 |
| 2017/0223752 A1* | 8/2017 | Jung | H04W 76/10 |
| 2017/0251516 A1* | 8/2017 | Bangolae | H04W 76/27 |
| 2017/0302421 A1* | 10/2017 | Hsu | H04L 5/0053 |
| 2017/0311290 A1* | 10/2017 | Adjakple | H04W 76/18 |
| 2017/0325283 A1* | 11/2017 | Wu | H04W 52/0216 |
| 2018/0110031 A1* | 4/2018 | Yoshizawa | H04W 76/10 |
| 2018/0176834 A1* | 6/2018 | Wei | H04W 36/0066 |
| 2018/0324655 A1* | 11/2018 | Comstock | H04W 36/00 |

* cited by examiner

CONFIGURING RADIO RESOURCE CONTROL CONNECTIONS

BACKGROUND

In some radio access networks, a central unit may include radio resource control (RRC) functionalities for establishing an RRC connection for a user device. Establishing the RRC connection may involve sending messages via a communication link between the central unit and a distributed unit. This may result in high latency for establishing the RRC connection.

BRIEF SUMMARY

This summary is provided to introduce a selection of concepts in a simplified form that are further described below in the Detailed Description. This Summary is not intended to identify key features or essential features of the various embodiments, nor is it intended to be used to limit the scope of the claims.

Systems, apparatuses, and methods are described for configuring radio resource control (RRC) connections. A distributed unit may receive, from a central unit, a lightweight RRC configuration message. The distributed unit may receive, from a user device and after receiving the lightweight RRC configuration message, an RRC connection request. The distributed unit may generate, based on the lightweight RRC configuration message, an RRC connection setup message indicating at least one communication parameter to be assigned to the user device. The distributed unit may send, to the user device, the RRC connection setup message.

In some examples, the distributed unit may, after sending the RRC connection setup message, send, to the central unit, a notification message indicating the sent RRC connection setup message. In some examples, the distributed unit may receive, from the user device, an RRC connection setup complete message. In some examples, the distributed unit may forward, to the central unit, the RRC connection setup complete message. In some examples, the distributed unit may receive, from the central unit, an RRC connection reconfiguration message indicating at least one change to the at least one communication parameter. The distributed unit may forward, to the user device, the RRC connection reconfiguration message.

In some examples, the generating of the RRC connection setup message may be based on determining that the RRC connection request indicates a low latency flag. In some examples, the generating of the RRC connection setup message may be based on determining that a quantity of a plurality of user devices connected to the distributed unit satisfies a threshold value indicated in the lightweight RRC configuration message.

In some examples, the generating of the RRC connection setup message may comprise determining, based on a signaling radio bearer (SRB) configuration indicated in the lightweight RRC configuration message, at least one of an SRB configuration to be assigned to the user device. The generating of the RRC connection setup message may comprise determining, based on a media access control (MAC) configuration indicated in the lightweight RRC configuration message, at least one of a MAC configuration to be assigned to the user device. The generating of the RRC connection setup message may comprise determining, based on a power headroom report (PHR) configuration indicated in the lightweight RRC configuration message, at least one of a PHR configuration to be assigned to the user device. The generating of the RRC connection setup message may comprise determining, based on an uplink power control configuration indicated in the lightweight RRC configuration message, at least one of an uplink power control configuration to be assigned to the user device. The generating of the RRC connection setup message may comprise determining, based on an uplink shared channel configuration indicated in the lightweight RRC configuration message, at least one of an uplink shared channel configuration to be assigned to the user device. The generating of the RRC connection setup message may comprise determining, based on a downlink shared channel configuration indicated in the lightweight RRC configuration message, at least one of a downlink shared channel configuration to be assigned to the user device. The generating of the RRC connection setup message may comprise determining, based on a plurality of physical uplink control channel (PUCCH) resources indicated in the lightweight RRC configuration message, at least one of a PUCCH resource to be assigned to the user device.

In some examples, the lightweight RRC configuration message may comprise a plurality of second RRC connection setup messages generated by the central unit. The generating of the RRC connection setup message may comprise selecting the RRC connection setup message from the plurality of second RRC connection setup messages. In some examples, the RRC connection request may indicate a priority associated with the RRC connection request. The selecting of the RRC connection setup message may be based on the priority.

In some examples, the receiving of the lightweight RRC configuration message may comprise receiving the lightweight RRC configuration message via a wired network, the receiving of the RRC connection request may comprise receiving the RRC connection request via a wireless network, and the sending of the RRC connection setup message may comprise sending the RRC connection setup message via the wireless network. In some examples, the distributed unit and the central unit comprise together a radio access node carrying out radio protocol stack, wherein the distributed unit is located geographically distant from the central unit.

In some examples, a distributed unit may comprise means for receiving, from a central unit, a lightweight RRC configuration message. The distributed unit may comprise means for receiving, from a user device and after receiving the lightweight RRC configuration message, an RRC connection request. The distributed unit may comprise means for generating, based on the lightweight RRC configuration message, an RRC connection setup message indicating at least one communication parameter to be assigned to the user device. The distributed unit may comprise means for sending, to the user device, the RRC connection setup message.

In some examples, a central unit may send, to a distributed unit, a lightweight RRC configuration message. The central unit may receive, from the distributed unit, an RRC connection setup message. The RRC connection setup message may be generated in response to the lightweight RRC configuration message and an RRC connection request from a user device. In some examples, a central unit may comprise means for sending, to a distributed unit, a lightweight RRC configuration message. The central unit may comprise means for receiving, from the distributed unit, an RRC connection setup message. The RRC connection setup message may be generated in response to the lightweight RRC configuration message and an RRC connection request from a user device. Additional examples are further discussed below.

BRIEF DESCRIPTION OF THE DRAWINGS

Some example embodiments are illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which are shown by way of illustration various embodiments in which the disclosure may be practiced. It is to be understood that other embodiments may be utilized and structural and functional modifications may be made without departing from the scope of the present disclosure.

Figure 1:
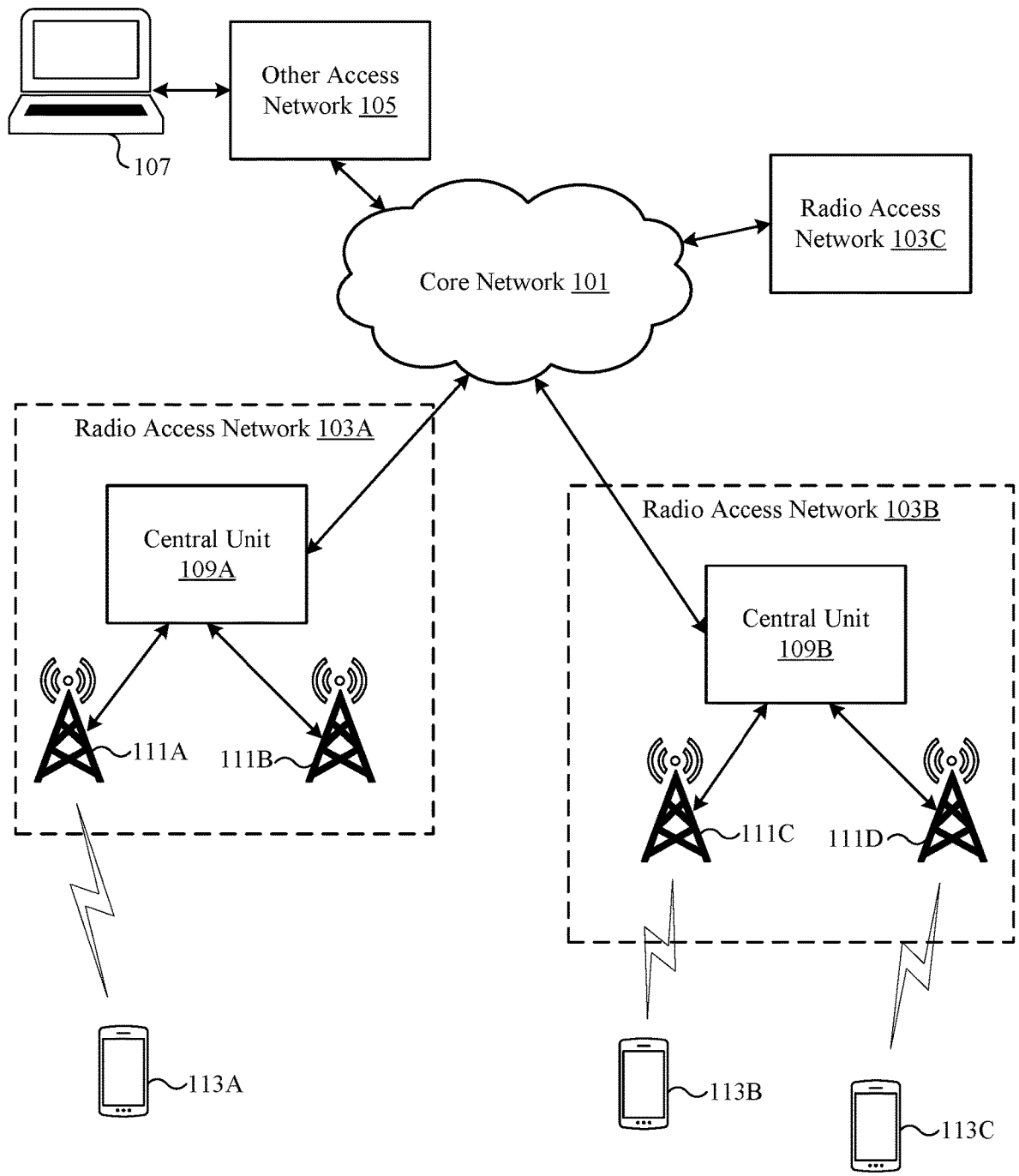
FIG. 1 is a schematic diagram showing an example communication network in which features described herein may be implemented.

FIG. 1 is a schematic diagram showing an example communication network in which features described herein may be implemented. The communication network may include one or more core networks (e.g., core network 101), one or more radio access networks (e.g., radio access networks 103A-103C), one or more other access networks (e.g., other access network 105), one or more user devices (e.g., user devices 107, 113A-113C).

The core network 101 may be a single network or a collection of multiple connected networks. The core network 101 may include one or more of any of various types of information distribution networks, such as, without limitation, a satellite network, a telephone network, a cellular network, a Wi-Fi network, an Ethernet network, an optical fiber network, a coaxial cable network, a hybrid fiber coax network, etc. The core network 101 may include a local area network (LAN), a wide area network (WAN), a backbone network, etc. The core network 101 may include an Internet Protocol (IP) based network (e.g., the Internet). The core network 101 may use a plurality of interconnected communication links to connect the radio access networks 103A-103C and the other access network 105.

The radio access networks 103A-103C may implement radio access technologies (e.g., the third generation wireless systems (3G), the fourth generation wireless systems (4G), Long Term Evolution (LTE), the fifth generation wireless systems (5G), etc.). A radio access network of the radio access networks 103A-103C may include one or more central units (CU) and one or more distributed units (DU). Such network architecture (e.g., the network architectures discussed herein) may be referred to as cloud radio access network architecture. A central unit may be connected to one or more distributed units. Together a central unit and one or more distributed units may comprise a radio access network node carrying out radio protocol stack. In 5G context, a combination of a central unit and one or more distributed units may comprise a gNB (or gNodeB). The gNB may be sometimes referred to as 5G base station.

The radio access network 103A may include a central unit 109A and distributed units 111A-111B, and the radio access network 103B may include a central unit 109B and distributed units 111C-111D.

The central units 109A-109B may communicate with the core network 101 via any type of communication link, such as fiber, cable, Ethernet, etc. The central unit 109A may communicate with the distributed units 111A-111B, and the central unit 109B may communicate with the distributed units 111C-111D, via any types of communication links, such as fiber, cable, Ethernet, etc.

A central unit of the central units 109A-109B may be any type of computing device. From a physical standpoint, the central unit may be implemented as a single device (such as a single server) or as a plurality of devices (such as a plurality of servers). Additionally or alternatively, the central units 109A-109B may be implemented in a centralized server (e.g., in a cloud computing datacenter). For example, data center network technology and/or cloud computing technology may be used to implement the central units 109A-109B in a centralized deployment, forming a pool of interconnected central units. The central units 109A-109B may be implemented as virtual nodes using virtualization technology. And real-time virtualization may allow computing resources to be dynamically allocated to the central units 109A-109B according to network load.

A distributed unit of the distributed units 111A-111D may be implemented as one or more computing devices (e.g., located at a cell tower or base station). The distributed units 111A-111D may communicate with the central units 109A-109B via any type of communication link (e.g., an IP-based communication link). Additionally or alternatively, a distributed unit of the distributed units 111A-111D may include a radio unit for wireless communication (e.g., mounted at the top of a cell tower or base station). The distributed unit may establish wireless communication links with user devices (e.g., the user devices 113A-113C). The wireless communication links may be implemented according to various standards, such as 3G, 4G, LTE, 5G, etc. More details on the radio access networks 103A-103C are further discussed in connection with FIGS. 2A-2B.

The user devices 107, 113A-113C may be, for example, smartphones, personal computers, tablets, desktop computers, laptop computers, gaming devices, virtual reality headsets, or any other mobile device or other fixed device having a wireless interface configured to communicating with a distributed unit. Some user devices (e.g., user device 107) may connect via the other access network 105 that might not be a radio access network. Although the concepts described below are described with respect to radio access networks, the principles described herein may be used in any type of access network.

Figure 2A:
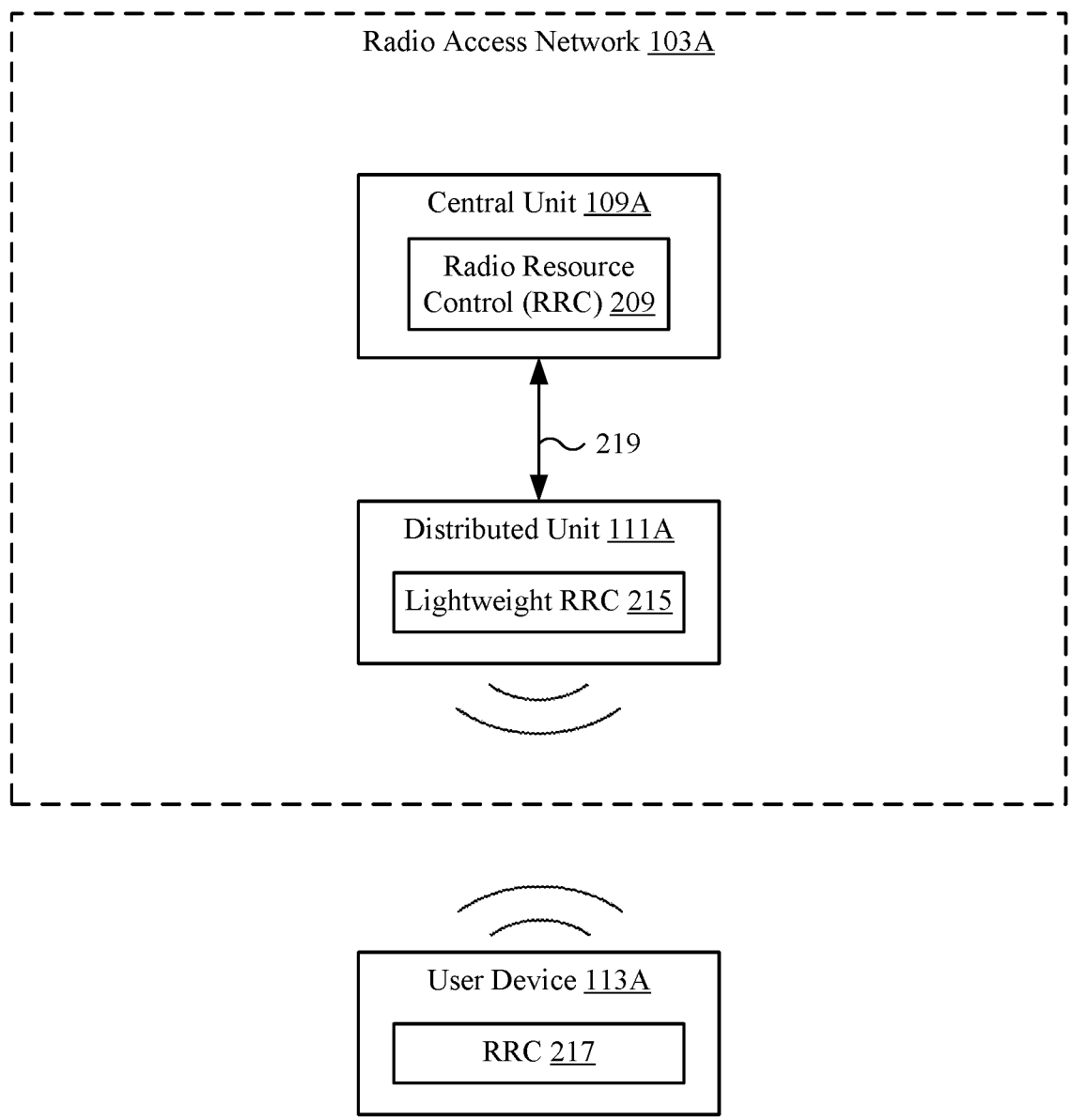
FIG. 2A is a schematic diagram showing an example system for configuring radio resource control (RRC) connections.

FIG. 2A is a schematic diagram showing an example system for configuring radio resource control (RRC) connections. In particular, FIG. 2A shows a system that may include the radio access network 103A and the user device 113A of FIG. 1, with the radio access network 103A including the central unit 109A and the distributed unit 111A. For convenience, the distributed unit 111B is omitted in FIG. 2A. The radio access network 103A may include additional and/or other central units and/or distributed units. The features and operations described below in connection with the radio access network 103A may also be found in, and performed by, the radio access networks 103B-103C and/or other radio access networks.

The central unit 109A may communicate with the distributed unit 111A via a communication link 219. The communication link 219 may be any type of communication link, such as fiber, cable, Ethernet, etc. Additionally or alternatively, the communication link 219 may be an IP-based communication link or a logical connection over an IP-based network. The central unit 109A and the distributed unit 111A may each have an IP address, and may communicate with each other using their IP addresses.

The distributed unit 111A may include a wireless interface, and may communicate with the user device 113A via a wireless communication link. The distributed unit 111A may wirelessly communicate with the user device 113A according to various wireless standards (e.g., 3G, 4G, LTE, 5G, or other wireless standards).

The radio access network 103A may be configured to implement radio access technologies (e.g., 3G, 4G, LTE, 5G, etc.), and may be configured to provide, to the user device 113A wireless access to the core network 101. The system may be configured to implement various communication protocols, such as communication protocols specified by the Third Generation Partnership Project (3GPP).

The distributed unit 111A may be responsible for processing some of the components of radio protocol stack, while the central unit 109A may be responsible for processing of some other components of the radio protocol stack. For example, some or all of layer 1 functionality, some or all of layer 2 functionality, and/or some or all of layer 3 functionality of the radio protocol stack may reside on the distributed unit 111A, while the upper portion of the radio protocol stack may reside on the central unit 109A. The distributed unit 111A may further include radio frequency (RF) components. The distributed unit 111A may be located closely to antennas. The central unit 109A may be located geographically distant from the distributed unit 111A and/or other distributed units.

In some embodiments, at least physical (PHY) and media access control (MAC) layers of radio protocol stack may reside on the distributed unit 111A, while at least RRC functions may reside at least partially on the central unit 109A.

The central unit 109A may include an RRC component 209. The RRC component 209 may be, for example, configured to implement processes according to the RRC protocol specified by 3GPP. The RRC component 209 may be configured to facilitate connection establishment and release, broadcast of system information, radio bearer establishment, reconfiguration and release, security mode procedures, RRC connection mobility procedures, paging notification and release, etc.

Figure 2B:
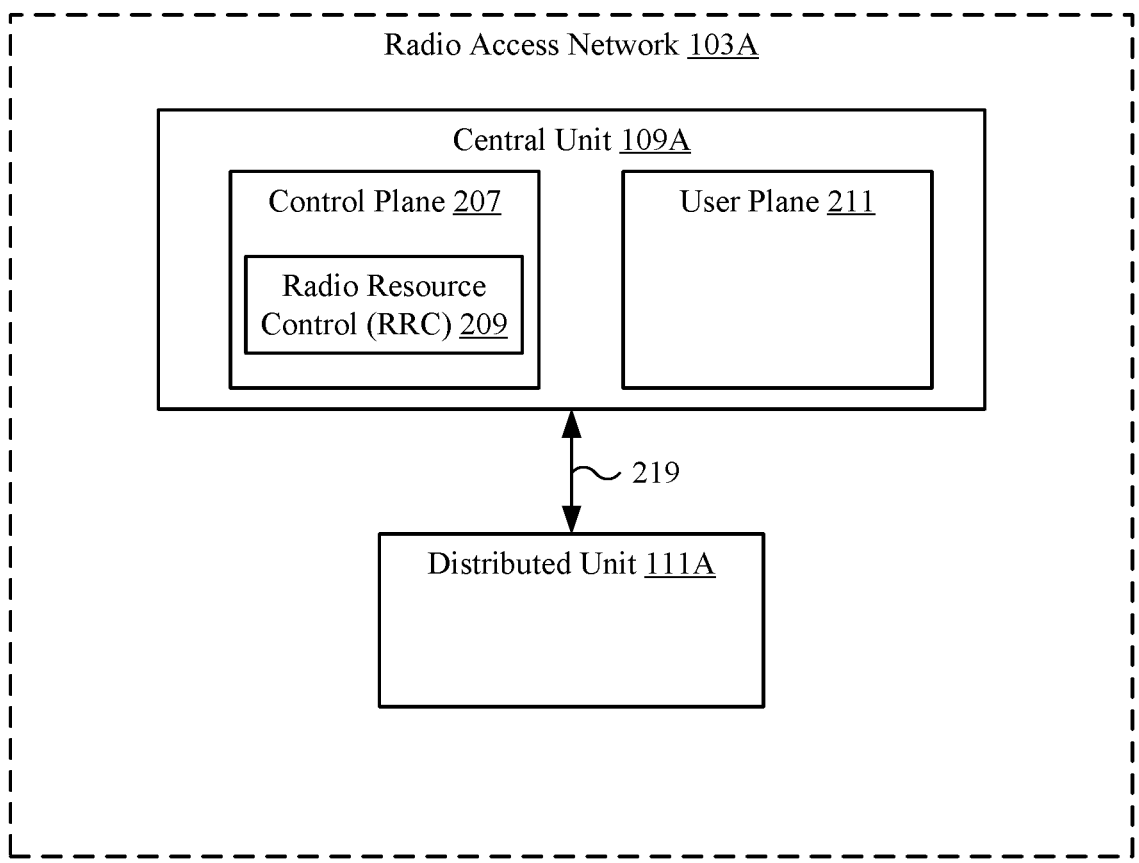
FIG. 2B is a schematic diagram showing another example system for configuring RRC connections.

Additionally or alternatively, referring to FIG. 2B, the central unit 109A may include a control plane 207 and a user plane 211. The control plane 207 and the user plane 211 may represent different areas of operations of the central unit 109A, and may correspond to hardware and/or software for performing such operations. The control plane 207 may be configured to process signaling and/or administrative traffic, and to manage wireless access by user devices. The user plane 211 may be configured to process user traffic, such as voice data, web browsing data, etc. The RRC component 209 may be included in the control plane 207. By means of signaling functions, the RRC component 209 may configure the control plane 207 and the user plane 211, and may allow for radio resource management strategies to be implemented.

Referring back to FIG. 2A, the RRC component 209 may send messages related to RRC functionalities via the communication link 219 (which may be a wired link, e.g., an IP-based communication link) to the distributed unit 111A. The distributed unit 111A may include MAC layer and/or PHY layer components of radio protocol stack, and may wirelessly communicate with the user device 113A. The distributed unit 111A may thus forward the messages from the RRC component 209 to the user device 113A over a wireless link.

The user device 113A may include a corresponding RRC component 217 for interfacing with the RRC counterpart residing on the network infrastructure side (e.g., the RRC component 209 in the central unit 109A). The RRC component 217 may communicate with the RRC component 209 through the distributed unit 111A for establishing an RRC connection. Establishing the RRC connection may indicate a transitioning from an RRC idle state to an RRC connected state.

Establishing the RRC connection may include a plurality of processes. For example, waking up from an RRC idle state, the user device 113A may send, to the distributed unit 111A, a random access preamble (RACH). The distributed unit 111A may send a random access response (RACH response). The user device 113A may send an RRC connection request to the distributed unit 111A, which may forward the RRC connection request to the central unit 109A. The central unit 109A may, based on the RRC connection request, generate an RRC connection setup message indicating a plurality of parameters for the user device 113A to use for communicating with the radio access network 103A. The central unit 109A may send the RRC connection setup message to the distributed unit 111A, which may forward the RRC connection setup message to the user device 113A. The user device 113A may configure itself according to the RRC connection setup message, and may send an RRC connection setup complete message to the distributed unit 111A, which may forward the RRC connection setup complete message to the central unit 109A. After the central unit 109A receives the RRC connection setup message, both the user device 113A and the central unit 109A mark the successful transition of the user device 113A from an RRC idle state to an RRC connected state, and the successful establishment of the RRC connection.

In some cases the user device 113A may be in an RRC inactive state, wherein the user device 113A and the network both store partial context information about the RRC connection of the user device 113A. In such cases, the user device 113A may resume its RRC connection, and transition to an RRC connected state, by sending an RRC connection resume request to the distributed unit 111A, which may in turn forward it to the central unit 109A. The central unit 109A may then respond with an RRC connection resume message, which completes the RRC connection establishment process.

When in the RRC connected state, the user device 113A may monitor control channels, may provide channel quality and feedback information, may perform neighboring cell measurements and measurement reporting, and etc. After establishing the RRC connection, the system may proceed to steps for establishing a user data transmission link (e.g., by setting up a data radio bearer (DRB)) for transmitting user data via the user plane 211.

During the processes for transitioning from the RRC idle state to the RRC connected state, or from the RRC inactive state to the RRC connected state, messages related to RRC functionalities may traverse the communication link 219 several times. For example, in the case of transitioning from the RRC idle state to the RRC connected state, the RRC connection request, the RRC connection setup message, and the RRC connection setup complete message may traverse the communication link 219. In the case of transitioning from the RRC inactive state to the RRC connected state, the RRC connection resume request and the RRC connection resume message (and/or other messages related to resuming the RRC connection) may traverse the communication link 219.

Depending on the type of the communication link 219, the latency for a message to traverse the communication link 219 may vary, and the overall latency for establishing the RRC connection may vary accordingly. For example, if the communication link 219 is an optical fiber based communication link, the latency for a message to traverse the communication link 219 may be, for example, 2 milliseconds, shorter than if the communication link 219 is a cable communication link (e.g., 5 milliseconds or more).

It may be advantageous to reduce the latency for establishing the RRC connection. For example, if a user associated with the user device 113A is making an emergency call, reducing the latency for establishing the RRC connection may allow the user to establish the emergency call more quickly. Applications running on the user device 113A (e.g., virtual reality applications) may require low latency for establishing a data connection with the core network 101. Additionally or alternatively, industrial standards may recommend a target for the latency for establishing the RRC connection. For example, 3GPP imposes a max limit of 10 milliseconds for control plane latency, which refers to the time to move from an RRC idle state to the RRC connected state.

To reduce the latency for establishing the RRC connection, the system may, for example, use optical fiber, instead of coaxial cable, to implement the communication link 219. But using optical fiber to implement the communication link 219 may be more expensive than using other types of communication media. Additionally or alternatively, the system may deploy the central unit 109A to be geographically close to the distributed unit 111A. But this may impede the system's ability to use data center technology and cloud computing technology to implement the central unit 109A.

Additionally or alternatively, in order to reduce latency, messaging over the communication link 219 may be optimized. For example, some of RRC functionalities may be moved from the central unit 109A to the distributed unit 111A. In this way, the number of RRC related messages traversing over the communication link 219 may be reduced. That is, the number of messages traversing between the central unit 109A and the distributed unit 111A may be reduced. In this way, some RRC related messages between the user device 113A and the network infrastructure may be terminated at the distributed unit 111A without a need to traverse all the way between the user device 113A and the central unit 109A. This may be achieved by pre-configuring the distributed unit 111A with certain RRC related parameters.

According to an embodiment, a lightweight RRC component 215 in the distributed unit 111A may be used to alleviate the challenges discussed above. The lightweight RRC component 215 may be configured to perform all or a portion of the functionalities of the RRC component 209 in the central unit 109A. For example, the lightweight RRC component 215 may be used for establishing RRC connections on behalf of the RRC component 209 in the central unit 109A. The RRC component 209 in the central unit 109A may configure the lightweight RRC component 215 to perform the functionalities of the RRC component 209. In this manner, messages (e.g., the RRC connection request, the RRC connection setup message, the RRC connection resume request, and/or the RRC connection resume message) may be communicated between the distributed unit 111A and the user device 113A, and need not traverse the communication link 219, which may have a high communication latency. In this way, some latencies associated with RRC messages may be reduced. For example, the latency for establishing the RRC connection may be reduced. More details regarding using the lightweight RRC component 215 for establishing the RRC connection are further discussed in connection with FIGS. 3-4.

Figure 3:
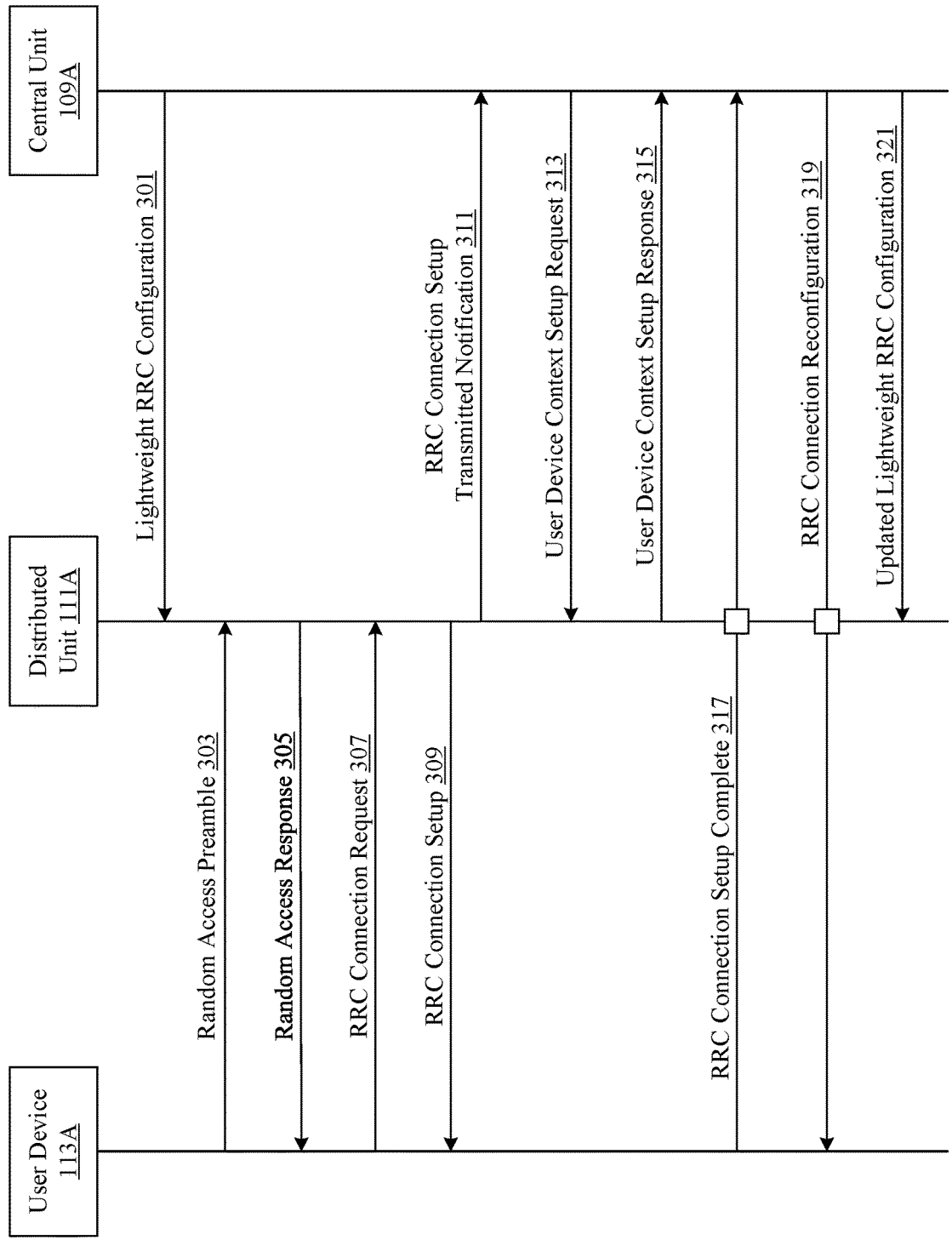
FIG. 3 shows an example event sequence for configuring RRC connections using a lightweight RRC component.

FIG. 3 shows an example event sequence for configuring RRC connections using a lightweight RRC component. While the steps of the event sequence are described in a particular order, the order of the steps may be altered without departing from the scope of the disclosure provided herein. Although the event sequence is described as being performed by a particular arrangement of computing systems, devices, and/or networks (e.g., the user device 113A, the distributed unit 111A, and/or the central unit 109A), the processes may be performed by a greater or smaller number of computing systems, devices, and/or networks, and/or by any type of computing system, device, and/or network.

In step 301, the central unit 109A (e.g., the RRC component 209 in the central unit 109A) may send, to the distributed unit 111A and via the communication link 219, a lightweight RRC configuration message. The central unit 109A may send the lightweight RRC configuration message at any time, and the lightweight RRC configuration message might not be related to a particular RRC connection request. For example, the central unit 109A may send lightweight RRC configuration messages periodically. Additionally or alternatively, the central unit 109A may send lightweight RRC configuration messages if the central unit 109A makes changes to the parameter values sent to the distributed unit 111A in previous lightweight RRC configuration messages.

The lightweight RRC configuration message may include any type of information that may be used for generating an RRC connection setup message (e.g., according to 3G, 4G, LTE, 5G, or other standards). For example, the lightweight RRC configuration message may include values for various parameters to be included in an RRC connection setup message. The parameters discussed herein may have similar meanings as those specified by 3GPP (e.g., in 3GPP Technical Specification 36.331 version 14.2.2 Release 14). The lightweight RRC configuration message may include information that is intended to be applicable to any user device requesting an RRC connection. Additionally or alternatively, the information may be targeted to specific user devices which may be requesting an RRC connection and/or may be sending an RRC connection resume request. For user devices that are in the RRC inactive state, the lightweight RRC configuration message may provide user device-specific information related to the RRC context established for the user device prior to entering the RRC inactive state, and may include ciphering keys and ciphering context. Many embodiments may support processing RRC connection requests and/or RRC connection resume requests. Some of the embodiments are described as processing one or the other of these, but it should be understood that the description of processing of one of these may be easily applied to the other as well.

The lightweight RRC configuration message may include, for example, information related to default signaling radio bearer (SRB) configuration, including downlink acknowledged mode radio link control (DL AM RLC) and uplink acknowledged mode radio link control (UL AM RLC) information. Such information may include, for example, T poll retransmit, a timer used by the transmitting side of an AM RLC entity in order to retransmit a poll. Such information may include maximum retransmission threshold, a parameter used by the transmitting side of an AM RLC entity to limit the number of retransmission of an AM mode data protocol data unit (AMD PDU). Such information may also include T reordering, a timer used by the receiving side of an AM RLC entity and receiving unacknowledged mode (UM) RLC entity in order to detect loss of RLC PDUs at lower layer. Such information may include T statusProhibit, a timer used by the receiving side of an AM RLC entity in order to prohibit transmission of a status PDU.

The lightweight RRC configuration message may include, for example, information related to media access control (MAC) configuration and uplink shared channel (UL-SCH) configuration. Such information may include, for example, timer configuration related to buffer status request (BSR), maximum number of hybrid automatic repeat request (HARQ) entries, transmit time interval (TTI) bundling information, time alignment timer information.

The lightweight RRC configuration message may include, for example, information related to power headroom report (PHR) configuration. Power headroom indicates how much transmission power is left for a user device to use in addition to the power being used by current transmission. Such information may include, for example, periodic PHR timer (periodicity of the PHR), prohibited PHR timer (downlink path loss more than the specified value also triggers PHR, provided the prohibited PHR timer has expired), DL path loss change threshold, etc. The lightweight RRC configuration message may include, for example, parameters related to uplink power control. For example, the lightweight RRC configuration message may include values for PO_UE_PUSCH, PO_UE_PUCCH, Delta_MCS_enabled, etc.

The lightweight RRC configuration message may include, for example, information related to physical downlink shared channel (PDSCH) configuration (e.g., pdsch-ConfigDedicated) and physical uplink shared channel (PUSCH) configuration (e.g., pusch-ConfigDedicated). The lightweight RRC configuration message may include information related to channel quality indicator (CQI) reporting related parameters and resource pools, such as simultaneousAckNackandCQI (true indicates that simultaneous transmission of Ack/Nack and CQI is allowed), cqi-ReportModeAperiodic (reporting mode parameter), WidebandCQI reporting information (communication bandwidth used when performing CQI reporting), CQI report periodicity. Other parameters for generating RRC connection setup messages (e.g., according to 3GPP standards) may additionally or alternatively be included in the lightweight RRC configuration message.

Additionally or alternatively, the central unit 109A may provide, to the lightweight RRC component 215 and in the lightweight RRC configuration message, an indication of a pool of available physical uplink control channel (PUCCH) resources which may be assigned to user devices (e.g., the user device 113A) for CQI reporting, for scheduling request indications, and/or for other purposes. The lightweight RRC component 215 may select, from the pool of PUCCH resources, a PUCCH resource to assign to a given user device after receiving the given user device's RRC connection request. For example, the central unit 109A may provide a list of physical resource blocks (PRBs) or a list of PUCCH resource indexes, from which the lightweight RRC component 215 may select a PRB or PUCCH resource index to assign to a user device. Additionally or alternatively, the lightweight RRC configuration message may include an indication of a threshold or maximum number of RRC connections that the distributed unit 111A may be allowed to process. After receiving an RRC connection request, the lightweight RRC component 215 may, for example, generate an RRC connection setup messages if the threshold or maximum number of RRC connections has not been reached. The lightweight RRC component 215 may forward the RRC connection request to the central unit 109A for processing if the threshold or maximum number has been reached. Additionally or alternatively, the lightweight RRC configuration message may contain an indication of a validity time or expiry time up to which the parameters indicated in the lightweight RRC configuration message may be treated as valid or beyond which the parameters may be treated as no longer applicable.

The distributed unit 111A (e.g., the lightweight RRC component 215) may receive the lightweight RRC configuration message, and may store (e.g., in a database table of the distributed unit 111A) the information (e.g., parameter values and/or resource information) included in the lightweight RRC configuration message. In some examples, the receiving of the lightweight RRC configuration message may comprise receiving the lightweight RRC configuration message via a wired network. The distributed unit 111A may use the stored information to generate subsequent RRC connection setup messages.

Additionally or alternatively, the central unit 109A may generate a plurality of pre-constructed RRC connection setup messages, and may send, to the distributed unit 111A, the plurality of pre-constructed RRC connection setup messages in the lightweight RRC configuration message. In this manner, the distributed unit 111A might not need to construct the RRC setup messages based on the parameter values and/or resource information, which may use a portion of the computing power of the distributed unit 111A. This may allow lower implementation complexity of the lightweight RRC component 215. In some embodiments, the lightweight RRC configuration message may include pre-constructed RRC connection resume messages targeted at certain specific user devices which have entered the RRC inactive state. The distributed unit 111A may use the pre-constructed RRC connection resume messages if it receives RRC connection resume requests from the user devices.

In step 303, the user device 113A may send, to the distributed unit 111A, a random access preamble to initiate a connection with the radio access network 103A. The user device 113A may wake up from an RRC idle state, and may try to establish connection with the radio access network 103A (and/or the core network 101). The user device 113A may send the random access preamble via a random access channel. The random access message may indicate, to the distributed unit 111A, that the user device 113A is trying to establish a connection, and may request the distributed unit 111A to assign, to the user device 113A, radio resources via which the user device 113A may send an RRC connection request. Additionally or alternatively, the random access preamble may indicate a random access preamble ID.

The distributed unit 111A may receive the random access preamble, and may assign resources for the user device 113A to send an RRC connection request. In step 305, the distributed unit 111A may send, to the user device 113A, a random access response. The random access response may indicate the random access preamble ID that was sent in the random access preamble, so that the user device 113A may know that the random access response is addressed to the user device 113A. The random access response may indicate an uplink resource assignment (e.g., for the user device 113A to send subsequent messages). The random access response may indicate a cell radio network temporary identify (C-RNTI), which may be used for identification of the user device 113A in subsequent messages.

The user device 113A may receive the random access response based on the random access preamble ID, and may extract information (e.g., the uplink resource assignment and the C-RNTI) from the random access response. In step 307, the user device 113A may send, to the distributed unit 111A, an RRC connection request via the assigned uplink resource. The RRC connection request may indicate the C-RNTI to identify the user device 113A. The RRC connection request may indicate the establishment cause which may specify the reason why the user device 113A initiates connection. The establishment cause may include, for example, emergency, high priority access, mobile terminating access, mobile originating signaling, mobile originating data, etc. Additionally or alternatively, the RRC connection request may include an indication of a flag requesting low-latency processing for the RRC connection request, and/or may include an indication of a priority of processing. Additionally or alternatively, the RRC connection request may indicate an international mobile subscriber identifier (IMSI) associated with the user device 113A. Additionally or alternatively, if the user device 113A is transitioning from the RRC inactive state the user device 113A may send an RRC connection resume request, instead of an RRC connection request.

The distributed unit 111A may receive the RRC connection request, and may determine whether to process the RRC connection request or to forward the RRC connection request to the central unit 109A for processing. In some examples, the receiving of the RRC connection request may comprise receiving the RRC connection request via a wireless network. If the distributed unit 111A determines to process the RRC connection request, the distributed unit 111A may generate an RRC connection setup message based on the information provided by the central unit 109A in the lightweight RRC configuration message, and may send the RRC connection setup message to the user device 113A in step 309. In some examples, the sending of the RRC connection setup message may comprise sending the RRC connection setup message via a wireless network. More details regarding processing the RRC connection request and generating the RRC connection setup message are discussed below in connection with FIG. 4.

After sending the RRC connection setup message to the user device 113A, the distributed unit 111A may in step 311 send, to the central unit 109A, a notification message indicating that the RRC connection setup message has been sent by the distributed unit 111A to the user device 113A. The notification message may include the RRC connection setup message that was sent to the user device 113A. The notification message may include the parameter values and/or resource assignments that were included in the RRC connection setup message. The notification message may additionally or alternatively include information indicated in the RRC connection request (e.g., the IMSI associated with the user device 113A). The notification message may additionally or alternatively include an identifier of the user device 113A such as the C-RNTI and/or the random access preamble ID.

Additionally or alternatively, the distributed unit 111A may receive an RRC connection resume request, and may handle the RRC connection resume request in a manner similar to handling the RRC connection request discussed above. For example, the distributed unit 111A may receive the RRC connection resume request, and may determine whether to process the RRC connection resume request or to forward the RRC connection resume request to the central unit 109A for processing. If the distributed unit 111A determines to process the RRC connection resume request, the distributed unit 111A may generate an RRC connection resume message based on information provided by the central unit 109A in the lightweight RRC configuration message, and may send the RRC connection resume message to the user device 113A in step 309. After sending the RRC connection resume message to the user device 113A, the distributed unit 111A may in step 311 send, to the central unit 109A, a notification message indicating that the RRC connection resume message has been sent by the distributed unit 111A to the user device 113A. The notification message may include the RRC connection resume message that was sent to the user device 113A. The notification message may include the parameter values and/or resource assignments that were included in the RRC connection resume message. The notification message may additionally or alternatively include information indicated in the RRC connection resume request (e.g., the IMSI associated with the user device 113A). The notification message may additionally or alternatively include an identifier of the user device 113A such as the C-RNTI and/or the random access preamble ID.

The central unit 109A may receive the notification message, and may proceed to subsequent steps for setting up a connection with the user device 113A (e.g., according to 3G, 4G, LTE, 5G, or other standards). For example, the central unit 109A may perform authentication and/or authorization of the user device 113A (e.g., based on the IMSI associated with the user device 113A). The central unit 109A may proceed to establishment of user-plane context within the central unit user plane 211. In step 313, the central unit 109A may send, to the distributed unit 111A, a user device context setup request. The user device context setup request may, for example, request the distributed unit 111A to set up data channels (e.g., a data radio bearer (DRB)) for the user device 113A. And in step 315, the distributed unit 111A may send, to the central unit 109A, a user device context setup response. The user device context setup response may indicate, for example, information regarding the establishment of the data channels.

Additionally or alternatively, the distributed unit 111A may send the notification message after receiving an RRC connection setup complete message in step 317 (described below). For example, the notification message may be added to the RRC connection setup complete message that is forwarded to the central unit 109A by the distributed unit 111A.

After the distributed unit 111A sends the RRC connection setup message in step 309, the user device 113A may receive the RRC connection setup message, and may configure the user device 113A based on the parameter values and/or resource assignments indicated in the RRC connection setup message. In step 317, the user device 113A may send, to the distributed unit 111A, an RRC connection setup complete message indicating that the user device 113A has completed RRC connection setup based on the RRC connection setup message. The RRC connection setup message may confirm the successful completion of an RRC connection establishment.

The distributed unit 111A may receive the RRC connection setup complete message, and may acknowledge that the user device 113A has completed RRC connection setup (e.g., by updating a record in the distributed unit 111A to reflect that the user device 113A has completed RRC connection setup). The distributed unit 111A may forward the RRC connection setup complete message to the central unit 109A. The RRC connection setup complete message that is forwarded by the distributed unit 111A may include a transaction identifier associated with the RRC connection establishment of the user device 113A.

As discussed above in connection with step 311, if the distributed unit 111A does not send the notification message immediately after sending the RRC connection setup message to the user device 113A, the distributed unit 111A may send the notification message (and/or the information indicated in the RRC connection setup message) together with the RRC connection setup complete message that is forwarded by the distributed unit 111A.

The central unit 109A may receive the RRC connection setup complete message forwarded by the distributed unit 111A, and may acknowledge that the user device 113A has established the RRC connection with the distributed unit 111A. Additionally or alternatively, the central unit 109A may determine (e.g., based on the notification message and/or the RRC connection setup complete message) the parameter values and/or resources assigned to the user device 113A. The central unit 109A may determine whether to modify and/or reconfigure any of the parameter values and/or resources assigned to the user device 113A.

For example, if the central unit 109A determines that it would have assigned different parameter values and/or resources had the RRC connection request been processed by the central unit 109A, the central unit 109A may send an RRC connection reconfiguration message in step 319. The RRC connection reconfiguration message may indicate the parameter values and/or resources that the central unit 109A may decide to assign to the user device 113A. Additionally or alternatively, if the central unit 109A determines that additional parameters may be configured for the user device 113A, the central unit 109A may send an RRC connection reconfiguration message to supplement the RRC connection setup message sent by the distributed unit 111A.

In step 319, the central unit 109A may send an RRC connection reconfiguration message to the distributed unit 111A. The distributed unit 111A may receive the RRC connection reconfiguration message, and may forward the RRC connection reconfiguration message to the user device 113A. Based on the RRC connection reconfiguration message, the distributed unit 111A may also update its record that is associated with the user device 113A and that stores parameter values and/or resource information.

In step 321, the central unit 109A may send an updated lightweight RRC configuration message to the distributed unit 111A. The updated lightweight RRC configuration message may be generated based on changed network conditions since the last lightweight RRC configuration message was sent (e.g., in step 301). For example, the central unit 109A may detect RRC connection release and/or handover events, which the distributed unit 111A might not track. If PUCCH resources are released during the RRC connection releases and/or handovers, the central unit 109A may determine an updated state of the PUCCH resources.

The central unit 109A may provide updated pools of resources (such as PUCCH resources) to the lightweight RRC component 215 in the distributed unit 111A. In this manner, the distributed unit 111A might only need to work with a subset of resources provided by the central unit 109A in the most recent updated lightweight RRC configuration message. And the distributed unit 111A might not need to track which resources have been released or reconfigured by the central unit 109A.

The central unit 109A may send the updated lightweight RRC configuration message periodically or continuously. Additionally or alternatively, if the quantity of resources in the pool of resources in the distributed unit 111A is less than a threshold, the distributed unit 111A may send a request to the central unit 109A to provide an updated set of resources or to replenish the pool of resources. And the central unit 109A may send an updated lightweight RRC configuration message to provide the distributed unit 111A with additional available resources (e.g., PUCCH resources).

Figure 4:
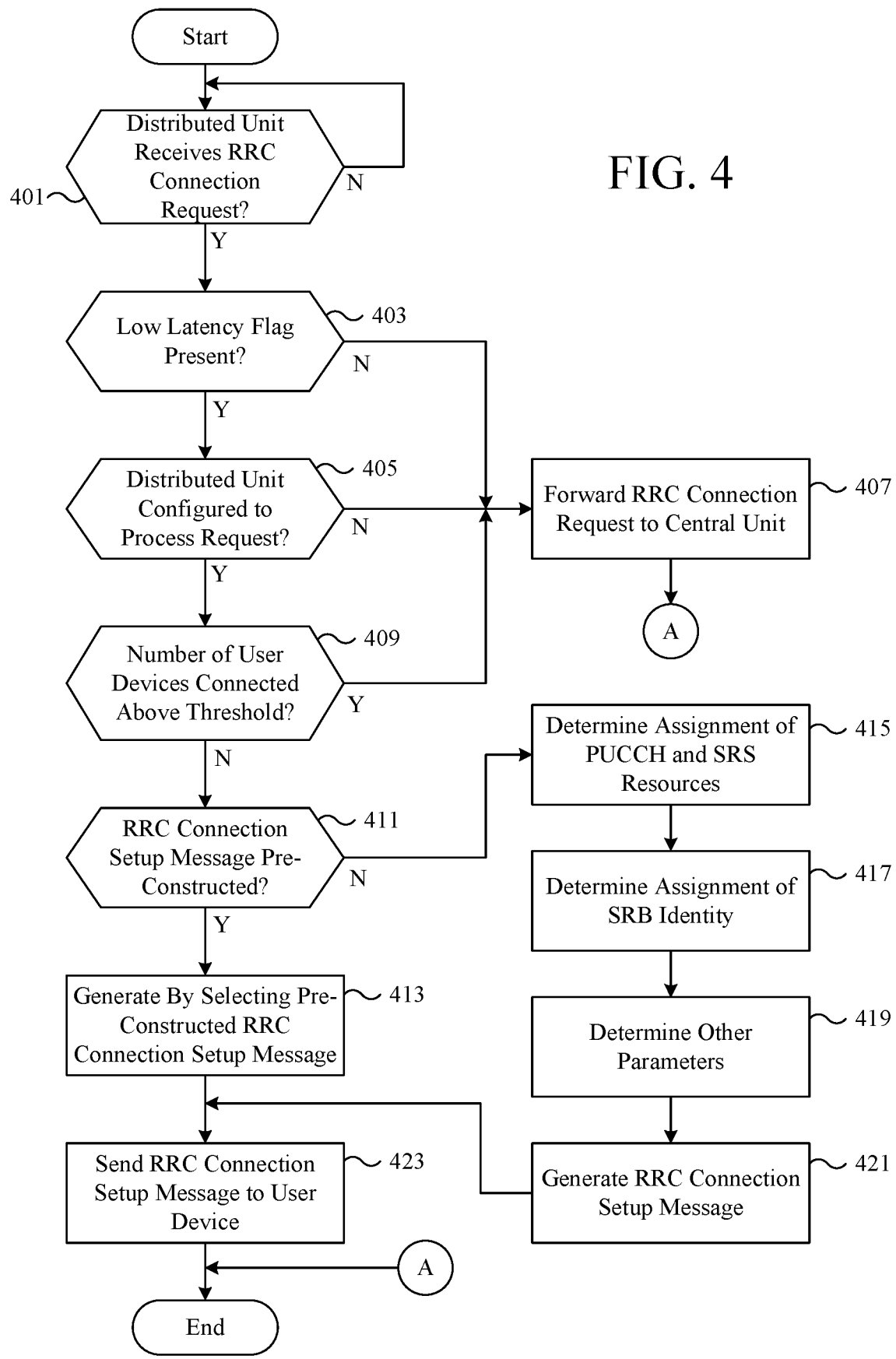
FIG. 4 is a flowchart showing an example method for configuring RRC connections.

FIG. 4 is a flowchart showing an example method for configuring RRC connections. The example method may be performed, for example, by the system (e.g., the distributed unit 111A) as discussed in connection with FIGS. 2A-2B. The steps of the example method may be described as being performed by particular computing devices for the sake of simplicity, but the steps may be performed by any computing devices. The method (and/or the steps of the method) is discussed below in connection with RRC connection requests. But the method (and/or the steps of the method) may be applicable to RRC connection resume requests and/or other types of requests (e.g., in order to reduce latency for establishing RRC connections).

In step 401, the distributed unit 111A may determine whether an RRC connection request (and/or an RRC connection resume request) is received from the user device 113A. The distributed unit 111A may listen to its incoming traffic and determine whether the incoming traffic includes an RRC connection request. If the distributed unit 111A determines that an RRC connection request is received from the user device 113A (or another user device), the method may proceed to step 403. Otherwise, the distributed unit 111A may continue to listen to its incoming traffic, and may determine whether an RRC connection request is received. If the distributed unit 111A receives an RRC connection request, the distributed unit 111A may determine whether to process the RRC connection request (e.g., by generating an RRC connection setup message in response), or to forward the RRC connection request to the central unit 109A for processing.

In step 403, the distributed unit 111A may determine whether a low latency flag is present in the RRC connection request (and/or in the random access preamble as discussed in connection with step 303). The low latency flag may be a one bit value included in the header of the RRC connection request and/or the random access preamble. For example, the one bit value may be included in the header of the MAC frames carrying the RRC connection request. If the one bit value is 1 (one), it may indicate that the user device 113A intended to have low latency processing of its RRC connection request. If the one bit value is 0 (zero), it may indicate that the user device 113A did not intend to have low latency processing of its RRC connection request.

Additionally or alternatively, the RRC connection request may include an establishment cause indicating the user device's reason for establishing the connection with the distributed unit 111A. The establishment cause may be, for example, emergency, high priority access, mobile terminating access, mobile originating signaling, mobile originating data, etc. If a user associated with the user device 113A is trying to make an emergency call, the RRC connection request may indicate the establishment cause to be emergency. The distributed unit 111A may determine whether to process the RRC connection request based on the establishment cause included in the RRC connection request. For example, if the establishment cause in the RRC connection request is emergency, the distributed unit 111A may determine to process the RRC connection request.

Additionally or alternatively, a low latency flag may be included in the payload of the RRC connection request (e.g., in addition to the establishment cause). And the distributed unit 111A may determine whether to process the RRC connection request based on the low latency flag in the payload of the RRC connection request. If the payload of the RRC connection request is encoded or encrypted, the distributed unit 111A may first decode or decrypt the RRC connection request before determining whether the low latency flag is present.

If the distributed unit 111A determines that the low latency flag is present, the method may proceed to step 405. Otherwise, the method may proceed to step 407. In step 405, the distributed unit 111A may determine whether the distributed unit 111A is configured to process the RRC connection request. The distributed unit 111A may make this determination in various manners. For example, the distributed unit 111A may determine whether the distributed unit 111A includes a lightweight RRC component (e.g., the lightweight RRC component 215). If the distributed unit 111A does not include a lightweight RRC component, the distributed unit 111A might not be configured to process the RRC connection request. If the distributed unit 111A includes a lightweight RRC component, the distributed unit 111A may determine that it is configured to process the RRC connection request. Additionally or alternatively, the central unit 109A may instruct the distributed unit 111A as to whether to process RRC connection requests. Additionally or alternatively, the distributed unit 111A may determine whether it has received a lightweight RRC configuration message from central unit 109A, and may further determine whether a validity time indicated in the lightweight RRC configuration message has not yet elapsed, in order to determine whether it has sufficient valid information to process the RRC connection request.

Additionally or alternatively, if the distributed unit 111A includes a lightweight RRC component (e.g., the lightweight RRC component 215), the distributed unit 111A may be configured to prevent overloading of the lightweight RRC component 215. The distributed unit 111A may track the rate at which RRC connection requests have been received by the distributed unit 111A (and/or processed by the lightweight RRC component 215), the processor consumption of the lightweight RRC component 215, and/or other metrics of load or usage. If the load on the lightweight RRC component 215 exceeds a threshold load level, the lightweight RRC component 215 may stop processing additional RRC connection requests, and may simply forward the additional RRC connection requests to the central unit 109A for processing. In this manner, the lightweight RRC component 215 may facilitate lowering the processing and/or transmitting latency for a subset of RRC connection requests (e.g., those that may be accommodated within the threshold load level). The remaining RRC connection requests may be forwarded to the central unit 109A, and may incur a higher processing and/or transmitting latency. Additionally or alternatively, if the distributed unit 111A is overloaded (e.g., if a load on the lightweight RRC component 215 exceeds a threshold load level), the distributed unit 111A may determine not to process the received RRC connection request, and may drop the received RRC connection request.

If the distributed unit 111A in step 405 determines that the distributed unit 111A is configured to process the RRC connection request, the method may proceed to step 409. Otherwise, the method may proceed to step 407. In step 407, the distributed unit 111A may forward the received RRC connection request to the central unit 109A. The central unit 109A may process the RRC connection request, and may generate an RRC connection setup message. The central unit 109A may send the RRC connection setup message to the distributed unit 111A, and the distributed unit 111A may forward the RRC connection setup message to the user device 113A.

In step 409, the distributed unit 111A may determine whether the number of user devices that have RRC connections with the distributed unit 111A exceeds a threshold number, or alternatively whether the number of user devices for which RRC connection setup messages have been processed by the distributed unit 111A exceeds a threshold number.

The distributed unit 111A may keep a list of user devices that have established RRC connections with distributed unit 111A. For example, every time the distributed unit 111A processes an RRC connection request from a user device and subsequently receives an RRC connection setup complete message from such a user device, the distributed unit 111A may add the user device to the list or increment a count of the number of requests processed by the distributed unit 111A. The distributed unit 111A may use other methods to determine the number of user devices connected to the distributed unit 111A. The threshold number may be set by the central unit 109A. For example, the central unit 109A may indicate the threshold number in the lightweight RRC configuration message. The threshold number may be updated by the central unit 109A in subsequent lightweight RRC configuration messages. The distributed unit 111A may reset the count of requests processed or number of user devices with RRC connections to zero when a subsequent lightweight RRC configuration message is received.

If the number of user devices that have RRC connections with the distributed unit 111A exceeds the threshold number, the distributed unit 111A may in step 407 determine to forward the received RRC connection request to the central unit 109A for processing. Additionally or alternatively, if the number of user devices that have RRC connections with the distributed unit 111A exceeds the threshold number, the distributed unit 111A may determine not to process the received RRC connection request, and may drop the received RRC connection request. Otherwise, the method may proceed to step 411. In step 411, the distributed unit 111A may determine to process the RRC connection request, and may determine whether the distributed unit 111A stores pre-constructed RRC connection setup messages.

The distributed unit 111A may in step 301 of FIG. 3 receive a lightweight RRC configuration message from the central unit 109A. The lightweight RRC configuration message may indicate parameter values and/or resource information which may be used to generate an RRC connection setup message, and/or may indicate a plurality of pre-constructed RRC connection setup messages generated by the central unit 109A.

If the distributed unit 111A determines that the distributed unit 111A stores pre-constructed RRC connection setup messages, the method may proceed to step 413, where the distributed unit 111A may select a pre-constructed RRC connection setup message. Otherwise, the method may proceed to step 415, where the distributed unit 111A may begin determining parameter values and/or resource assignments for the RRC connection setup message based on the parameter values and/or resource information provided by the central unit 109A in the lightweight RRC configuration message.

In step 415, the distributed unit 111A may determine PUCCH resources for assigning to the user device 113A. The PUCCH resources may be used for CQI reporting and/or for other purposes such as scheduling request indications. The distributed unit 111A may select, from the pool of PUCCH resources (e.g., a set of PRBs) provided by the central unit 109A, some resources for assigning to the user device 113A. The distributed unit 111A may make the selection in various manners. For example, the distributed unit 111A may use the round robin algorithm to select a PRB from the set of PRBs. Additionally or alternatively, the distributed unit 111A may maximally allocate resources from one PRB first before allocating resources from another PRB. Additionally or alternatively, the central unit 109A may indicate, in the lightweight RRC configuration message, the manner in which the distributed unit 111A may select the PUCCH resources for assigning to the user device 113A. Additionally or alternatively, the distributed unit 111A may determine sound reference signal (SRS) resources for assigning to the user device 113A, in a similar manner as with PUCCH resources.

In step 417, the distributed unit 111A may determine the SRB identity (e.g., the SRB1 identity) to be assigned to the user device 113A. The assigned SRB may be used by the user device 113A to send subsequent signaling messages (e.g., the RRC connection setup complete message). In step 419, the distributed unit 111A may determine other parameter values (e.g., parameters for configuration of MAC, physical channels, power control, etc.) to be assigned to the user device 113A. For example, the distributed unit 111A may use the parameter values included in the lightweight RRC configuration message. The distributed unit 111A may include, in the RRC connection setup message, all or a portion of the parameters values from the lightweight RRC configuration message.

In step 421, the distributed unit 111A may generate the RRC connection setup message based on the parameter values and/or resource information determined in steps 415, 417, 419. The RRC connection setup message may be encoded using abstract syntax notation (ASN). After step 421, the method may proceed to step 423, where the distributed unit 111A may send the generated RRC connection setup message to the user device 113A.

If the distributed unit 111A in step 411 determines that the distributed unit 111A stores a plurality of pre-constructed RRC connection setup messages, the distributed unit 111A may in step 413 select a pre-constructed RRC connection setup message from the plurality of pre-constructed RRC connection setup messages. The distributed unit 111A may make the selection in various manners. For example, the distributed unit 111A may randomly select one pre-constructed RRC connection setup message. Additionally or alternatively, the selection may be made based on a priority associated with the user device 113A. The priority associated with the user device 113A may be determined, for example, based on the establishment cause as indicated in the RRC connection request. If the establishment cause is emergency (e.g., if a user associated with the user device 113A is trying to make an emergency call), the distributed unit 111A may select a particular type of pre-constructed RRC connection setup message that may be configured to provide the user device 113A with a larger amount of resources (e.g., PUCCH resources) and/or stable connection resources. After selecting the pre-constructed RRC connection setup message, the distributed unit 111A may in step 423 send the pre-constructed RRC connection setup message to the user device 113A.

Figure 5:
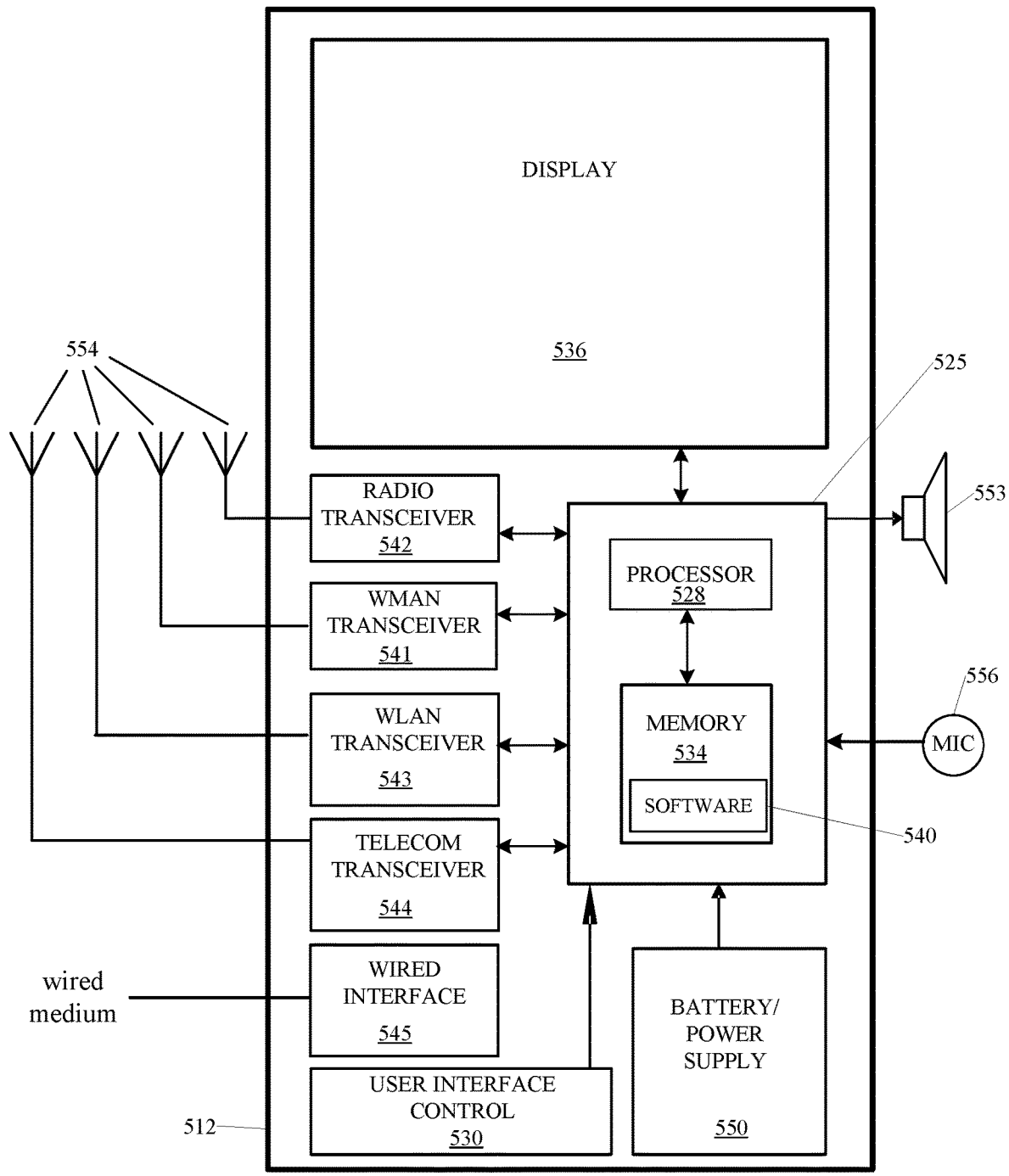
FIG. 5 shows an example apparatus that may be used in a network environment described herein or used to implement one or more aspects described herein.

FIG. 5 illustrates an example apparatus, in particular a computing device 512, that may be used in a communication network such as the one shown in FIG. 1, to implement any or all of the user devices 107, 113A-113C, the distributed units 111A-111D, the central units 109A-109B, and/or other computing devices to perform the steps described above and in FIGS. 2A-2B and FIGS. 3-4. Computing device 512 may include a controller 525. The controller 525 may be connected to a user interface control 530, display 536 and/or other elements as shown. Controller 525 may include circuitry, such as for example one or more processors 528 and one or more memory 534 storing software 540. The software 540 may comprise, for example, one or more of the following software options: user interface software, server software, etc., including the lightweight RRC component 215, the RRC component 209, and the RRC component 217.

Device 512 may also include a battery 550 or other power supply device, speaker 553, and one or more antennae 554. Device 512 may include user interface circuitry, such as user interface control 530. User interface control 530 may include controllers or adapters, and other circuitry, configured to receive input from or provide output to a keypad, touch screen, voice interface—for example via microphone 556, function keys, joystick, data glove, mouse and the like. The user interface circuitry and user interface software may be configured to facilitate user control of at least some functions of device 512 though use of a display 536. Display 536 may be configured to display at least a portion of a user interface of device 512. Additionally, the display may be configured to facilitate user control of at least some functions of the device (for example, display 536 could be a touch screen).

Software 540 may be stored within memory 534 to provide instructions to processor 528 such that when the instructions are executed, processor 528, device 512 and/or other components of device 512 are caused to perform various functions or methods such as those described herein. The software may comprise machine executable instructions and data used by processor 528 and other components of computing device 512 and may be stored in a storage facility such as memory 534 and/or in hardware logic in an integrated circuit, ASIC, etc. Software may include both applications and operating system software, and may include code segments, instructions, applets, pre-compiled code, compiled code, computer programs, program modules, engines, program logic, and combinations thereof.

Memory 534 may include any of various types of tangible machine-readable storage medium, including one or more of the following types of storage devices: read only memory (ROM) modules, random access memory (RAM) modules, magnetic tape, magnetic discs (for example, a fixed hard disk drive or a removable floppy disk), optical disk (for example, a CD-ROM disc, a CD-RW disc, a DVD disc), flash memory, and EEPROM memory. As used herein (including the claims), a tangible or non-transitory machine-readable storage medium is a physical structure that may be touched by a human. A signal would not by itself constitute a tangible or non-transitory machine-readable storage medium, although other embodiments may include signals or ephemeral versions of instructions executable by one or more processors to carry out one or more of the operations described herein.

As used herein, processor 528 (and any other processor or computer described herein) may include any of various types of processors whether used alone or in combination with executable instructions stored in a memory or other computer-readable storage medium. Processors should be understood to encompass any of various types of computing structures including, but not limited to, one or more microprocessors, special-purpose computer chips, field-programmable gate arrays (FPGAs), controllers, application-specific integrated circuits (ASICs), combinations of hardware/firmware/software, or other special or general-purpose processing circuitry.

As used in this application, the term "circuitry" may refer to any of the following: (a) hardware-only circuit implementations (such as implementations in only analog and/or digital circuitry) and (b) combinations of circuits and software (and/or firmware), such as (as applicable): (i) a combination of processor(s) or (ii) portions of processor(s)/software (including digital signal processor(s)), software, and memory(ies) that work together to cause an apparatus, such as a mobile phone, server, or other computing device, to perform various functions) and (c) circuits, such as a microprocessor(s) or a portion of a microprocessor(s), that require software or firmware for operation, even if the software or firmware is not physically present.

These examples of "circuitry" apply to all uses of this term in this application, including in any claims. As an example, as used in this application, the term "circuitry" would also cover an implementation of merely a processor (or multiple processors) or portion of a processor and its (or their) accompanying software and/or firmware. The term "circuitry" would also cover, for example, a baseband integrated circuit or applications processor integrated circuit for a mobile phone or a similar integrated circuit in a server, a cellular network device, or other network device.

Device 512 or its various components may be mobile and be configured to receive, decode and process various types of transmissions including transmissions in Wi-Fi networks according to a wireless local area network (e.g., the IEEE 802.11 WLAN standards 802.11n, 802.11ac, etc.) and/or wireless metro area network (WMAN) standards (e.g., 802.16), through a specific one or more WLAN transceivers 543, one or more WMAN transceivers 541. Additionally or alternatively, device 512 may be configured to receive, decode and process transmissions through various other transceivers, such as FM/AM Radio transceiver 542, and telecommunications transceiver 544 (e.g., cellular network receiver such as CDMA, GSM, 4G LTE, 5G, etc.). A wired interface 545 (e.g., an Ethernet interface) may be configured to provide communication via a wired communication medium.

Although the above description of FIG. 5 generally relates to a mobile device, other devices or systems may include the same or similar components and perform the same or similar functions and methods. For example, a computer communicating over a wired network connection (for example, the distributed units 111A-111D, the central units 109A-109B, and the user device 107) may include the components or a subset of the components described above, and may be configured to perform the same or similar functions as device 512 and its components. Further access points as described herein may include the components, a subset of the components, or a multiple of the components (e.g., integrated in one or more servers) configured to perform the steps, described herein.

Although specific examples of carrying out the disclosure have been described, those skilled in the art will appreciate that there are numerous variations and permutations of the above-described systems and methods that are contained within the spirit and scope of the disclosure. Any and all permutations, combinations, and sub-combinations of features described herein, including but not limited to features specifically recited in the claims, are within the scope of the disclosure.

What is claimed is:

1. A method comprising:
   receiving, by a distributed unit from a central unit, wherein the distributed unit is located geographically distant from the central unit, a lightweight radio resource control (RRC) configuration message, wherein the lightweight RRC configuration message includes information for generating an RRC connection setup message, the distributed unit and the central unit comprising together the radio access node carrying out a radio protocol stack;
   receiving, by the distributed unit from a user device and after receiving the lightweight RRC configuration message, an RRC connection request;
   generating, by the distributed unit based on the lightweight RRC configuration message, an RRC connection setup message indicating at least one communication parameter to be assigned to the user device; and
   sending, by the distributed unit to the user device, the RRC connection setup message.

2. The method of claim 1, further comprising:
   after sending the RRC connection setup message, sending, to the central unit, a notification message indicating the sent RRC connection setup message.

3. The method of claim 1, further comprising:
   receiving, from the user device, an RRC connection setup complete message; and
   forwarding, to the central unit, the RRC connection setup complete message.

4. The method of claim 1, further comprising:
   receiving, from the central unit, an RRC connection reconfiguration message indicating at least one change to the at least one communication parameter; and
   forwarding, to the user device, the RRC connection reconfiguration message.

5. The method of claim 1, wherein the generating the RRC connection setup message is based on determining that the RRC connection request indicates a low latency flag.

6. The method of claim 1, wherein the generating the RRC connection setup message is based on determining that a quantity of a plurality of user devices connected to the distributed unit satisfies a threshold value indicated in the lightweight RRC configuration message.

7. The method of claim 1, wherein the generating the RRC connection setup message comprises at least one of:
   determining, based on a signaling radio bearer (SRB) configuration indicated in the lightweight RRC configuration message, at least one of an SRB configuration to be assigned to the user device;
   determining, based on a media access control (MAC) configuration indicated in the lightweight RRC configuration message, at least one of a MAC configuration to be assigned to the user device;
   determining, based on a power headroom report (PHR) configuration indicated in the lightweight RRC configuration message, at least one of a PHR configuration to be assigned to the user device;

determining, based on an uplink power control configuration indicated in the lightweight RRC configuration message, at least one of an uplink power control configuration to be assigned to the user device;

determining, based on an uplink shared channel configuration indicated in the lightweight RRC configuration message, at least one of an uplink shared channel configuration to be assigned to the user device;

determining, based on a downlink shared channel configuration indicated in the lightweight RRC configuration message, at least one of a downlink shared channel configuration to be assigned to the user device; or determining, based on a plurality of physical uplink control channel (PUCCH) resources indicated in the lightweight RRC configuration message, at least one of a PUCCH resource to be assigned to the user device.

8. The method of claim 1, wherein the lightweight RRC configuration message comprises a plurality of second RRC connection setup messages generated by the central unit, and wherein the generating the RRC connection setup message comprises selecting the RRC connection setup message from the plurality of second RRC connection setup messages.

9. The method of claim 8, wherein the RRC connection request indicates a priority associated with the RRC connection request, and wherein the selecting the RRC connection setup message is based on the priority.

10. An apparatus comprising:
one or more processors; and
memory storing instructions that, when executed by the one or more processors, cause the apparatus to:
receive, by a distributed unit from a central unit, wherein the distributed unit is located geographically distant from the central unit, a lightweight radio resource control (RRC) configuration message, wherein the lightweight RRC configuration message includes information for generating an RRC connection setup message, the distributed unit and the central unit comprising together the radio access node carrying out a radio protocol stack;
receive, by the distributed unit from a user device and after receiving the lightweight RRC configuration message, an RRC connection request;
generate, based on the lightweight RRC configuration message, an RRC connection setup message indicating at least one communication parameter to be assigned to the user device; and
send, by the distributed unit to the user device, the RRC connection setup message.

11. The apparatus of claim 10, wherein the instructions, when executed by the one or more processors, further cause the apparatus to:
after sending the RRC connection setup message, send, to the central unit, a notification message indicating the sent RRC connection setup message.

12. The apparatus of claim 10, wherein the instructions, when executed by the one or more processors, further cause the apparatus to:
receive, from the user device, an RRC connection setup complete message; and
forward, to the central unit, the RRC connection setup complete message.

13. The apparatus of claim 10, wherein the instructions, when executed by the one or more processors, further cause the apparatus to:
receive, from the central unit, an RRC connection reconfiguration message indicating at least one change to the at least one communication parameter; and
forward, to the user device, the RRC connection reconfiguration message.

14. The apparatus of claim 10, wherein the generating the RRC connection setup message is based on determining that the RRC connection request indicates a low latency flag.

15. The apparatus of claim 10, wherein the generating the RRC connection setup message is based on determining that a quantity of a plurality of user devices connected to the apparatus satisfies a threshold value indicated in the lightweight RRC configuration message.

16. The apparatus of claim 10, wherein the lightweight RRC configuration message comprises a plurality of second RRC connection setup messages generated by the central unit, and wherein the generating the RRC connection setup message comprises selecting the RRC connection setup message from the plurality of second RRC connection setup messages.

17. A non-transitory computer-readable medium storing computer-readable instructions that, when executed by a computing device, cause the computing device to:
receive, by a distributed unit from a central unit, wherein the distributed unit is located geographically distant from the central unit, a lightweight radio resource control (RRC) configuration message, wherein the lightweight RRC configuration message includes information for generating an RRC connection setup message, the distributed unit and the central unit comprising together the radio access node carrying out a radio protocol stack;
receive, by the distributed unit from a user device and after receiving the lightweight RRC configuration message, an RRC connection request;
generate, based on the lightweight RRC configuration message, an RRC connection setup message indicating at least one communication parameter to be assigned to the user device; and
send, by the distributed unit to the user device, the RRC connection setup message.

18. An apparatus comprising:
one or more processors; and
memory storing instructions that, when executed by the one or more processors, cause the apparatus to:
send, by a central unit to a distributed unit, wherein the distributed unit is located geographically distant from the central unit, a lightweight radio resource control (RRC) configuration message, wherein the lightweight RRC configuration message includes information for generating an RRC connection setup message and the distributed unit and the central unit of the radio access node for carrying out a radio protocol stack; and
receive, by the central unit from the distributed unit, an RRC connection setup message, wherein the RRC connection setup message is generated in response to the lightweight RRC configuration message and an RRC connection request from a user device.

* * * * *